United States Patent [19]
Fodale et al.

[11] Patent Number: 5,265,498
[45] Date of Patent: Nov. 30, 1993

[54] METHOD OF SHIFT TORQUE MANAGEMENT FOR AN ELECTRONIC AUTOMATIC TRANSMISSION SYSTEM

[75] Inventors: Francis M. Fodale, Beverly Hills; Stuart M. Davis, Bloomfield Hills, both of Mich.

[73] Assignee: Chrysler Corporation, Highland Park, Mich.

[21] Appl. No.: 876,637

[22] Filed: Apr. 30, 1992

[51] Int. Cl.$^5$ .................. B60K 41/08; B60K 41/04
[52] U.S. Cl. .................................. 74/858; 74/857; 364/424.1
[58] Field of Search ................ 74/857, 858; 364/424.1

[56] References Cited

U.S. PATENT DOCUMENTS

| | | | |
|---|---|---|---|
| 4,688,450 | 8/1987 | Hayashi et al. | 74/858 X |
| 4,719,573 | 1/1988 | Kissel et al. | 364/431.07 |
| 4,792,902 | 12/1988 | Hrovat et al. | 364/424.1 |
| 4,811,223 | 3/1989 | Iwatsuki et al. | 74/866 X |
| 4,819,187 | 4/1989 | Yasue et al. | 364/424.1 X |
| 4,875,391 | 10/1989 | Leising et al. | 74/866 |
| 4,905,545 | 3/1990 | Leising et al. | 74/871 |
| 4,968,999 | 11/1990 | Fodale et al. | 74/866 X |
| 5,058,013 | 10/1991 | Iwatsuki et al. | 364/424.1 |
| 5,091,857 | 2/1992 | Katayama et al. | 364/424.1 X |
| 5,101,687 | 4/1992 | Iwatsuki et al. | 74/858 |

Primary Examiner—Leslie A. Braun
Assistant Examiner—David E. Henn
Attorney, Agent, or Firm—Mark P. Calcaterra

[57] ABSTRACT

A method is provided for controlling engine torque from a vehicle engine to an electronically controlled transmission in response to predetermined conditions existing in the transmission. The method includes the steps of saving in memory data corresponding to a spark advance and fuel flow setting, detecting whether an upshift or downshift is in process, determining if the upshift or downshift has just started if an upshift or downshift is detected, variably adjusting the spark advance setting of the engine in accordance with a detected upshift or downshift if the upshift or downshift has just started, decrementing the amount of fuel flow to the engine during adjustment of the spark advance, and returning both the fuel flow and spark advance to its original setting.

8 Claims, 6 Drawing Sheets

METHOD OF SHIFT TORQUE MANAGEMENT FOR AN ELECTRONIC AUTOMATIC TRANSMISSION SYSTEM

BACKGROUND OF THE INVENTION

1. Field of the Invention

The present invention relates generally to an automatic transmission primarily intended for motor vehicle use, and more particularly, to a method of reducing shift torque from an engine to a transmission that is controlled electronically and hydraulically.

2. Description of the Related Art

Generally speaking, land vehicles require three basic components. These components comprise a power plant (such as an internal combustion engine) a power train and wheels. The power train's main component is typically referred to as the "transmission". Engine torque and speed are converted in the transmission in accordance with the tractive-power demand of the vehicle.

Transmissions are generally referred to as manually actuated or automatic transmissions. Automatic transmissions are designed to take automatic control of the frictional units, gear ratio selection and gear shifting. The control system of the automatic transmission is typically hydraulically operated through the use of several valves to direct and regulate the supply of pressure. This hydraulic pressure control will cause either the actuation or deactuation of the respective frictional units for effecting gear changes in the transmission. However, in recent years, a more advanced form of transmission control system has been proposed, which would offer the possibility of enabling the transmission to adapt itself to changing conditions. An example of such an electronic automatic transmission system is disclosed in U.S. Pat. No. 4,875,391 entitled "An Electronically-Controlled, Adaptive Automatic Transmission System" to Leising et al.

One feature of the above patented automatic transmission system is a method of shift torque management. This feature issued into a corresponding patent, U.S. Pat. No. 4,968,999, entitled "Method of Shift Torque Management for an Electronic Automatic Transmission System" to Fodale et al. The patented method reduced shift torque from the engine to the automatic transmission in response to predetermined conditions existing in the transmission. Although this patented method has worked well, there is still a need in the art to provide more enhanced shift torque management to reduce the input power during the shift to improve clutch durability and shift quality.

SUMMARY OF THE INVENTION

It is, therefore, one object of the present invention to provide a method of reducing shift torque from an engine to a transmission in response to predetermined conditions existing in the transmission.

It is another object of the present invention to provide more enhanced shift torque management from the engine to the transmission by regulating the spark advance and fuel to the engine.

To achieve the foregoing objects, the present invention is a method of controlling engine torque from a vehicle engine to an electronically controlled automatic transmission in response to predetermined conditions existing in the transmission. The method includes the steps of detecting whether a shift needing torque management is an upshift or downshift, then executing both spark advance derate (using less spark advance than optimal for power) and fuel shut off for the type of shift detected.

One advantage of the present invention is that a method is provided to reduce the shift torque from the engine to the transmission in response to predetermined conditions existing in the transmission so as to minimize the potential interference and possible damage to any of the electronically controlled transmission components. Another advantage of the present invention is that shift torque management is enhanced by regulating the spark advance and fuel to the engine.

Other objects, features and advantages of the present invention will be readily appreciated as the same becomes better understood after reading the following description taken in conjunction with the accompanying drawings.

BRIEF DESCRIPTION OF THE DRAWINGS

FIGS. 6 and 7 are flowcharts of a fuel shut-off methodology, according to the present invention, of the shift torque management methodology of FIGS. 2 and 3.

DESCRIPTION OF THE PREFERRED EMBODIMENT(S)

Generally, an automatic transmission is adapted for use in a vehicle (not shown) such as an automobile. The present invention is used with an automatic transmission and control system of the type disclosed in U.S. Pat. No. 4,875,391 to Leising et al., the disclosure of which is hereby incorporated by reference.

The control system for the automatic transmission includes a dedicated wire called a Torque Reduction (TRD) link and located between an engine controller and transmission controller. The TRD link is capable of transmitting a bi-state (high/low) voltage signal 10. By sending pulses or signals on or across the TRD link, the transmission controller is able to indicate to the engine controller as to whether an upshift 12 or downshift 14 is in process. The transmission controller will typically only send the signals across the TRD wire during high throttle angles and engine speeds.

Accordingly, a communication method is disclosed to detect shift recognition. At the beginning of a shift, the transmission controller puts or transmits a low voltage signal on or across the TRD link. This region of the shift timing, designated "A", signals the start of shift torque management and what type of shift is going to occur. A low voltage signal that lasts a first predetermined or upshift amount such as 44 milliseconds (msec) or longer indicates that an upshift is occurring while a low voltage signal which lasts a second predetermined or downshift amount such as less than 44 msec indicates that a downshift is occurring. It should be appreciated that the first and second predetermined amounts are programmable and may be a value other than that specified.

Figure 1:
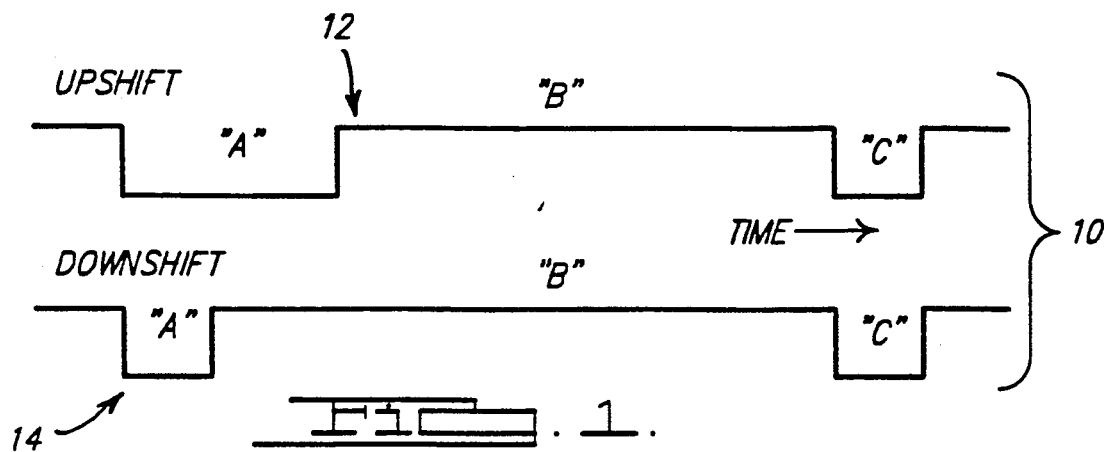
FIG. 1 illustrates signals between an engine controller and transmission controller to identify an upshift or downshift occurring in the transmission.

The transmission controller will put the TRD link back to a high voltage signal at the beginning of the speed change. This starts the region labeled "B" in FIG. 1, which indicates to the engine controller that actual shift torque management should start now. Within one second of entering the "B" region, the engine controller will verify the shift torque management request with the transmission controller over the Chrysler Collision Detector (CCD) serial data bus. This technology is described in U.S. Pat. No. 4,706,082.

The transmission controller will transmit a signal across the TRD link at a low voltage for 21 msec when shift torque management is no longer needed. This area of the shift timing is labeled "C" and signals the end of shift torque management. Once the TRD link goes low at region "C", the engine controller begins to gradually restore the spark advance and/or fuel back to their normal levels.

Figure 2:
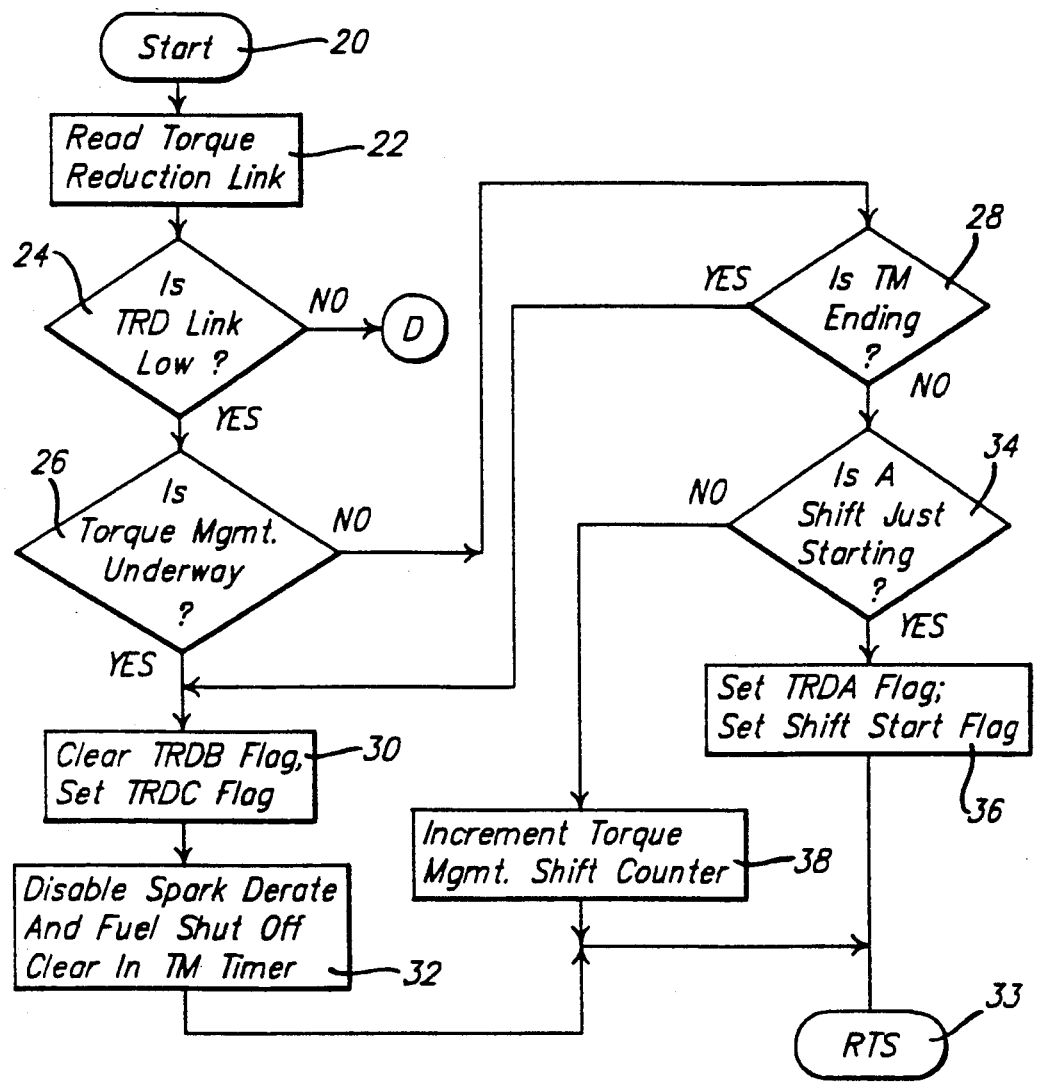
FIGS. 2 and 3 are flowcharts of a shift torque management methodology according to the present invention.

Referring now to FIGS. 2 through 7, a method is disclosed to control the shift torque and coordinate its output with the transmission. As illustrated in FIG. 2, a shift torque management methodology begins or starts in bubble 20 by initializing and calibrating predetermined values for normal operation between the engine controller and the transmission controller. From bubble 20, the methodology advances to block 22 and the signal across the TRD link is read by the engine controller from the transmission controller. Based on the signal as previously described, the engine controller determines if an upshift, downshift, or other type of shift torque management is currently being detected.

The methodology next falls through to decision block 24 and determines if the signal across the TRD link is low. If the signal across the TRD link is low, the methodology falls through to decision block 26 and determines if shift torque management is underway, for example, by looking for a flag or by reading a bit on a Torque Management Status Register (TMSTAT) in the engine controller. If the TRDB flag is set or the bit has a 1, then shift torque management is currently underway. If the TRDB flag is clear or the bit has a 0, then shift torque management is not currently underway.

If the TRDB flag or bit was set in block 26, the methodology advances to block 3 and shift torque management is ended. This is accomplished by clearing the TRDB flag or by making the bit 0 and at the same time setting a torque reduction section "C" (TRDC) flag or bit. The methodology then advances to block 32 and disables the spark advance derate and fuel shut off routines to be described. This is accomplished by the engine controller clearing a torque management spark derate (TMDRAT) flag and a torque management fuel shut off (TMFSO) flag. The engine controller also clears a torque management timer or counter (TROCNT). These flags or bits are located within the TMSTAT register of the engine controller. The methodology then advances to bubble 33 and returns to a main program of the engine controller to perform other engine control tasks.

Referring back to decision block 26, if the TRDB flag or bit was not set, the methodology will fall to decision block 28. In decision block 28, the engine controller determines if the shift torque management is already ending. This is accomplished by the engine controller checking to see if the TRDC flag or bit is set. If the TRDC flag is set, the methodology will drop to block 30 previously described. If the TRDC bit was not set, the methodology will fall to decision block 34. In decision block 34, the engine controller will determine if a shift is just starting by checking a shift starting flag (SHSTFL) to determine if it is clear. The SHSTFL flag is located as a bit in the TMSTAT register. If the SHSTFL flag is clear, this indicates that shift has not started and the methodology falls to block 36. In block 36, the methodology starts the determination of the shift type by setting the torque reduction section "A" (TRDA) bit or flag and the SHSTFL flag. After setting the above bits or flags, the methodology returns in bubble 33.

In decision block 34, if the SHSTFL flag is set, this indicates that a shift has already started and the methodology falls to block 38. In block 38, the methodology increments the shift torque management counter (TRQCNT). The TRQCNT keeps track of the number of loops (length of time) in section "A" to determine the type of shift: upshift or downshift. After incrementing the TRQCNT, the methodology returns through bubble 33.

Figure 3:
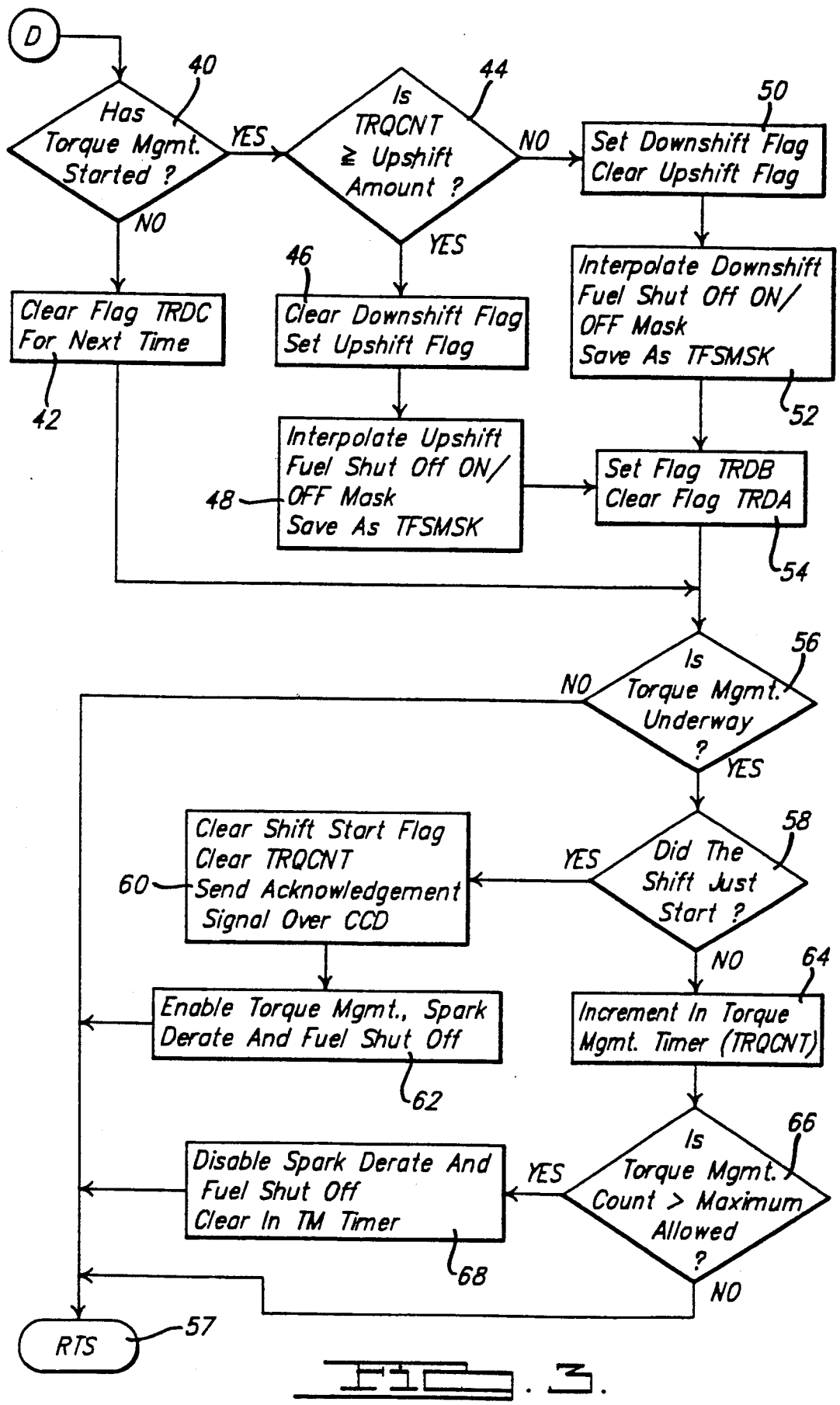

Referring back to decision block 24, if the engine controller finds that the signal across the TRD link is not low, the methodology advances to decision block 40 illustrated in FIG. 3. In decision block 40, the methodology determines if shift torque management has been started by checking to see if the TRDA flag is already set. If the TRDA flag is already set, the methodology falls to decision block 44 and determines if TRQCNT is greater than or equal to a first predetermined amount. This allows the engine controller to determine how long the signal across the TRD link has been low. If TRQCNT is found to be greater than or equal to the first predetermined or upshift amount representing an upshift, the methodology advances to block 46 and selects the shift. The fact that the TRQCNT was greater than upshift amount indicates that an upshift is occurring, therefore, the upshift flag (UPSHF) is set and the downshift flag (DWNSHF) is cleared by the engine controller. The UPSHF and DWNSHF flags are both located as bits in the TMSTAT register. The methodology then falls to block 48 and interpolates an upshift fuel shut off mask (UPFSOM). The interpolation is performed on a table stored in memory of UPFSOM versus the throttle minus the minimum throttle (THR-MINTHR) position. This interpolation data will be used to regulate the fuel throughout the shift torque management methodology. This interpolation value is saved as TFSMSK for use by the methodology later. The methodology next enters block 54 and puts the shift torque management underway by setting the TRDB flag and clearing the TRDA flag. This means that the engine controller recognizes that the transmission controller has put the signal across the TRD link high again and that it must now actually reduce engine torque via the spark advance derate and fuel shut off routines.

Referring back to block 44, if the TRQCNT is not less than the upshift amount, the methodology advances to block 50 and selects the shift type. In this case, the shift type will be a downshift because the signal across the TRD link was low for less than the upshift amount. The selection is accomplished by setting the DWNSHF flag and clearing the UPSHFT flag. The methodology advances to block 52 and interpolates a downshift fuel shut off mask (DNFSOM). The interpolation is performed on a table stored in memory of DNFSOM versus the throttle minus the minimum throttle position. This interpolation will also be saved as TFSMSK. The methodology then falls to block 54 previously described.

Referring back to block 40, if shift torque management has not started by finding the TRDA flag clear, the methodology falls through to block 42 where the TRDC flag is cleared for the next time the methodology is needed to run.

From both block 42 and block 54, the methodology advances to decision block 56 and determines if shift torque management is underway. This will be accomplished by the engine controller examining the TRDB flag and determining if it is set. If the TRDB flag is found to be clear, the methodology will return to the main program through bubble 57. However, if the TRDB flag is set, which indicates the signal across the TRD link is still high and shift torque management is still underway, the methodology will fall to decision block 58. In decision block 58, the methodology determines if the shift has just started by checking a shift start flag (SHFSTR) located in the engine controller to determine if it is equal to a predetermined value such as one (1). If a shift has just started because SHFSTR equals one, the methodology advances to block 60 and clears the SHFSTR flag and TRQCNT. This in effect will switch the timing device from shift type determination to the in torque management timer. The engine controller will also send an acknowledgement signal for such an action over the Chrysler Collision Detector (CCD) to the transmission controller. The methodology next advances to block 62 and enables the actual torque reduction routines, spark advance derate and fuel shut off. These two routines are enabled by setting the torque management spark derate (TMDRAT) and torque management fuel shut off (TMFSO) flags. After setting the TMDRAT and TMFSO flags by the transmission controller, the methodology returns to the main program through bubble 57.

Referring back to decision block 58, if the SHFSTR register does not equal 1, which means that a shift has not just started, the methodology will proceed on to block 64. In block 64, the methodology increments TRQCNT. This will keep track of the number of loops the actual torque reduction routines have actually completed. The methodology then advances to decision block 66 and determines if TRQCNT is greater than a predetermined maximum time (INTMMX), which for example can be 2.74 sec. This block 66 is thus testing to determine if the shift torque management cycle has been completed according to a predetermined set value. If TRQCNT is not greater than INTMMX, the methodology returns to the main program through bubble 57. If TRQCNT is greater than INTMMX, the methodology falls to block 68 and the shift torque management cycle is ended. This is accomplished by disabling the spark advance derate and fuel shut off routines by clearing both the TMDRAT and TMFSO flags. The TRQCNT is also cleared in order to prepare for the next shift torque management cycle. The methodology then returns to the main program through bubble 57.

Figure 4:
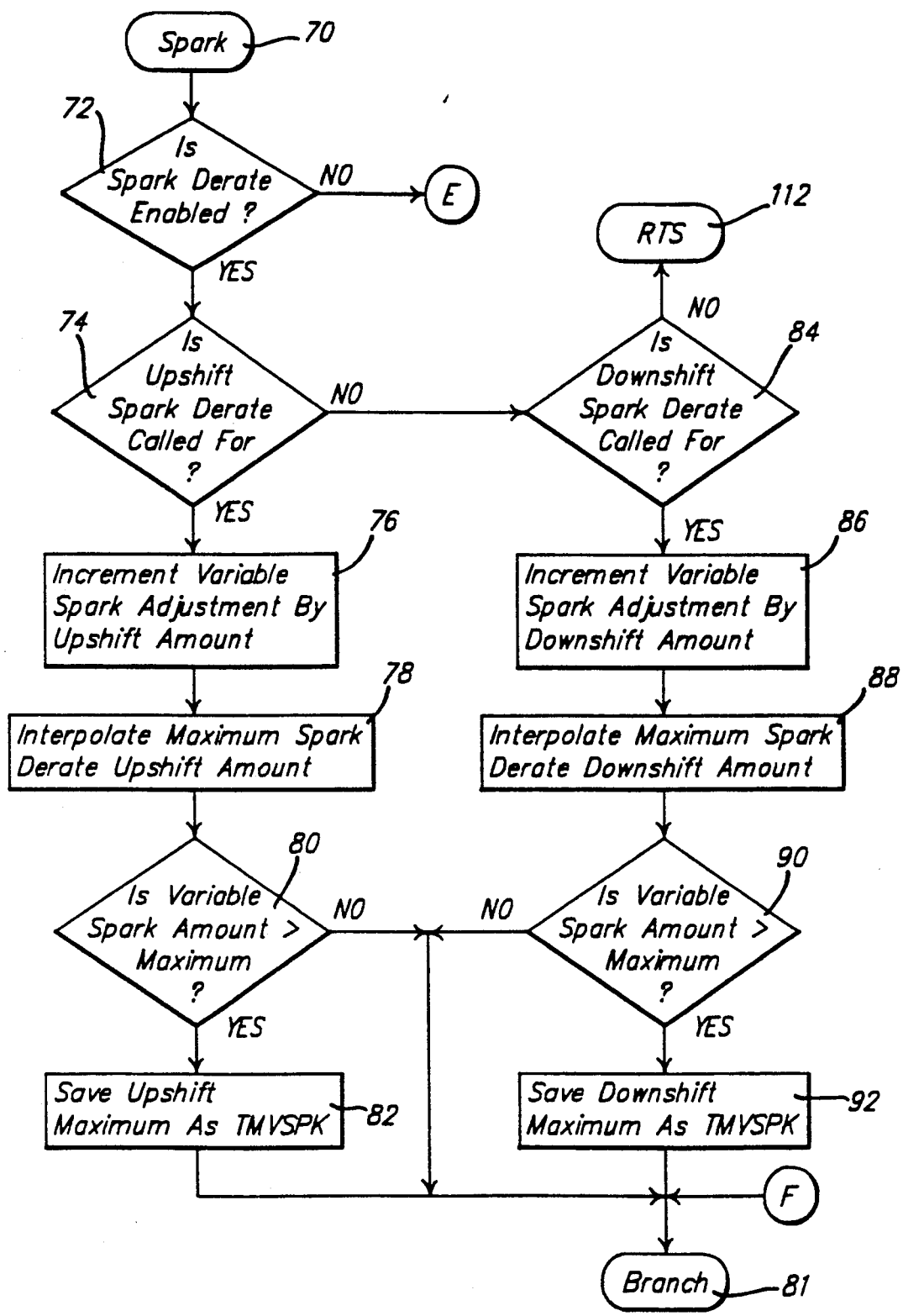
FIGS. 4 and 5 are flowcharts of a spark advance derate methodology, according to the present invention, of the shift torque management methodology of FIGS. 2 and 3.

Referring now to FIG. 4, a flowchart for a spark advance derate routine or methodology of the shift torque management methodology is illustrated. The methodology starts in bubble 70 and advances to decision block 72. In decision block 72, the methodology determines if the spark advance derate is enabled. This is accomplished by the engine controller checking to see if the TMDRAT flag is set. If the TMDRAT flag is set, the methodology advances to decision block 74 and determines if an upshift spark advance derate is called for. This is accomplished by checking to see if the upshift (UPSHF) flag is set. If an upshift is coming by the UPSHF flag being set, the methodology advances to block 76 and increments a torque management variable spark (TMVSPK) register by a spark increment upshift (SPKIUP) value. This in effect adds the predetermined value of SPKIUP to the variable spark advance amount (TMVSPK) every 10.75 second loop in the routine. This causes a ramping of the spark advance derate, so that there is no sudden change in spark advance, but a smooth gradual change.

From block 76, the methodology advances to block 78 and interpolates a predetermined spark advance upshift maximum (SPUPMX) amount of the derate. This interpolation is performed on a table stored in memory of SPUPMX versus throttle minus the minimum throttle position. This amount represents the total amount of spark advance derate needed (in conjunction with fuel shut off) to meet the torque reduction requirement of the upshift. The methodology then advances to decision block 80 and determines if the engine has reached the maximum spark amount allowable by comparing to see if the variable spark amount (TMVSPK) is greater than SPUPMX. If not, the methodology advances to bubble 81 to use TMVSPK in the spark advance derate currently underway. TMVSPK is then used as the new spark advance by the engine controller to adjust the timing of the spark for each cylinder. If so, the methodology advances to block 82 and saves this SPUPMX as TMVSPK. The methodology then advances to bubble 92 to use TMVSPK in the spark advance derate currently underway.

Referring back to block 74, if an upshift is not occurring, the methodology advances to block 84 and determines if a downshift spark advance derate is called for. This is accomplished by the engine controller checking to see if the downshift (DWNSHF) flag is set. The DWNSHF flag will be set if the signal across TRD link has been low for less than the upshift amount. If a downshift spark advance derate is called for by the DWNSHF flag being set, the methodology will fall through to block 86. In block 86, the methodology increments variable spark adjustment (TMVSPK) by a predetermined downshift amount (SPKDN) so that the spark is advanced to the point where the downshift is smooth. The methodology then advances to block 88 and interpolates a predetermined spark advance downshift SPDNMX amount of derate. The interpolation is performed on a table stored in memory of the maximum spark derate downshift amount versus the throttle minus the minimum throttle position. This maximum represents the total amount of spark derate needed (in conjunction with fuel shut off) to meet the torque reduction requirement of the downshift. From block 88, the methodology advances to block 90 and determines if this TMVSPK is greater than SPDNMX. If TMVSPK is not greater than SPDNMX, the methodology advances to bubble 81 previously described. If TMVSPK is greater than SPDNMX, the methodology advances to block 92 and saves SPDNMX as TMVSPK. The methodology then branches through bubble 81.

Figure 5:
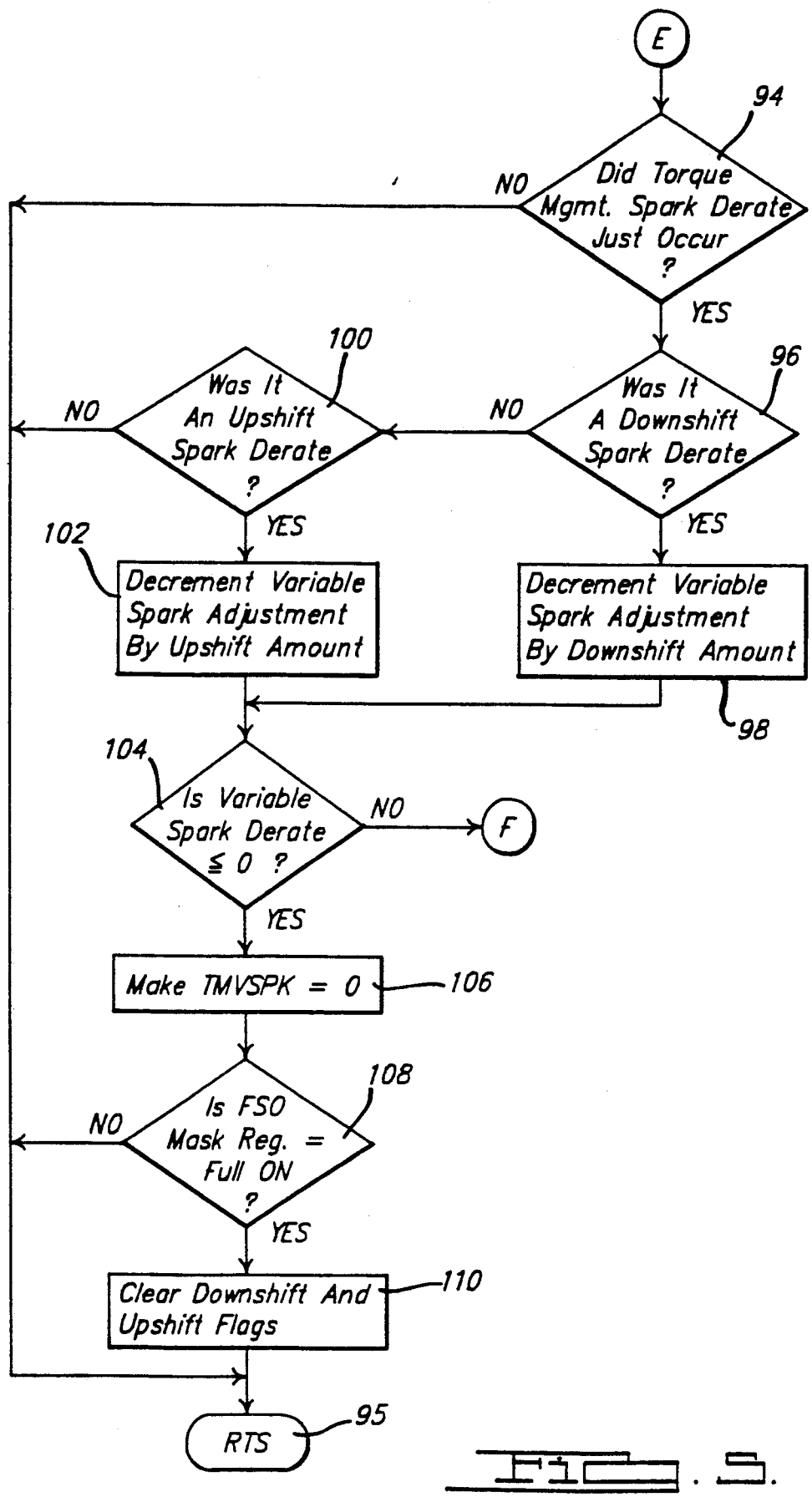
Figure 5:
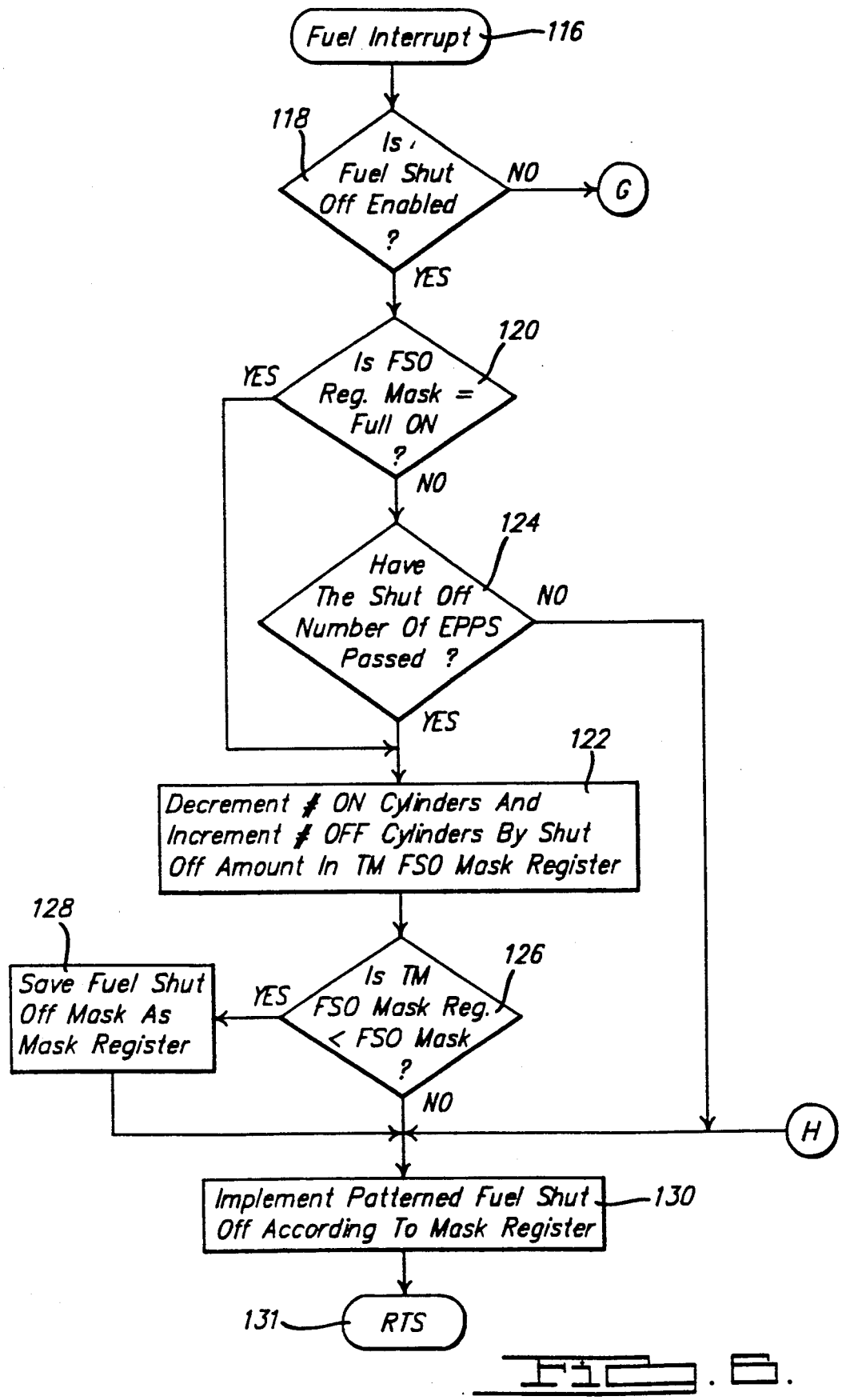

Referring back to block 72, if the spark advance derate is not enabled, the methodology enters decision block 94 in FIG. 5, and determines if torque management spark advance derate has just occurred. This is determined by testing TMVSPK to see if it is greater than zero. A value other than zero shows that an adjustment was being made to the spark advance which means that a spark advance derate has just occurred. If a spark advance derate has not just occurred, the methodology returns through bubble 95. If a spark advance derate has just occurred, the methodology advances to decision block 96 and determines if the spark derate was for a downshift by checking to see if the DWNSHF flag was set. If not, the methodology advances to decision block 100 and determines if the spark advance derate was for an upshift by checking to see if the UPSHF flag was set. If not, the methodology returns through bubble 95. It should be appreciated that the upshift and downshift flags are checked in blocks 96 and 100 with the one being set indicating what type of shift spark advance derate has just occurred.

If a downshift spark advance derate was found to have occurred in decision block 96, the methodology advances to block 98 and decrements the TMVSPK by the downshift spark amount (SPKDDN). This in effect will gradually set the spark advance rate back to its normal level. If an upshift spark advance derate was found to have occurred in decision block 100, the methodology advances to block 102 and decrements the TMVSPK by the upshift spark amount (SPKDUP) in order to return the engine controller back to its normal sparking rate in a gradual ramping manner. This will keep the engine from making sudden torque changes during the ramping phase of the methodology.

From blocks 98 and 102, the methodology advances to decision block 104 and determines if the TMVSPK is less than or equal to zero. This is done by checking the TMVSPK register and determining its value. If the TMVSPK is greater than zero, the methodology advances to bubble 81 previously described. If the TMVSPK is less than or equal to zero, the methodology advances to block 106 and makes or sets TMVSPK equal to zero in order to protect against underflow spark advance. This will ensure that the engine will run smoothly throughout the entire shifting process.

From block 106, the methodology advances to decision block 108 and determines if a fuel shut off mask register (TMFSMR) is in the full ON position. If not, the methodology returns through bubble 95. If so, the methodology advances to block 110 and resets the upshift and downshift flags for the next event. This resetting is done by clearing both the UPSHF and DWNSHF flags. The methodology then returns through bubble 95 to the main program to complete the shift torque management routine or methodology underway.

The above describes the spark advance derate routine or methodology where the spark advance of the engine is variably adjusted depending if a downshift or upshift is occurring. This is one way to help control the engine power being sent to the transmission during the shifting process. Another way is by regulating the amount of fuel actually being sent to the engine cylinders. This is controlled with the fuel shut off routine illustrated in FIG. 6.

Referring to FIG. 6, the fuel shut off routine or methodology enters through bubble 116 and advances to decision block 118. In decision block 118, the methodology determines if the fuel shut off register is enabled by checking to see if the TMFSO flag is set. If the fuel shut off is enabled, the methodology falls through to decision block 120 and determines if the fuel is full ON. This determines whether the routine is on the first pass of the ramp off of the fuel. If TMFSMR does equal full ON, the methodology advances to block 122 and decrements the number of ON cylinders and increments the number of OFF cylinders by a shut off amount (SOFAMT) in the torque management fuel shut off mask register (TMFSMR).

Referring back to block 120, if the TMFSMR does not equal full ON, the methodology advances to decision block 124. In decision block 124, the methodology determines if a predetermined shut off number of fuel injection events (SOFEPP) have passed which signals the shut off amount of fuel to be decremented again from the TMFSMR (current ON/OFF pattern) amount. The SOFEPP register keeps track of the number of fuel injection events that have occurred. This controls the decrement of the fuel in order to provide a smooth engine transition and not one where engine overspeeding and underspeeding are the normal. If so, the methodology then advances to block 122 previously described. If not, the methodology advances to block 130 to be described.

From block 122, the methodology advances to block 126 and determines if the TMFSMR is less than the TMFMSK. The fuel shut off pattern will continue to be implemented until the TMFSMR decrements down to the TMFMSK, the mask which is determined in block 48 (upshift) or 52 (downshift) and which represents (in conjunction with the spark derate) the amount of torque reduction needed for the particular shift occurring. If TMFSMR is less than TMFMSK, the methodology advances to block 128 and TMFMSK will be saved as TMFSMR. After block 128 is completed or TMFSMR is not less than TMFMSK, the methodology advances to block 130 and implements the patterned alternating fuel shut off according to the value for TMFSMR. This pattern will continue to happen until the above two conditions are met. The methodology then returns through bubble 131.

Figure 7:
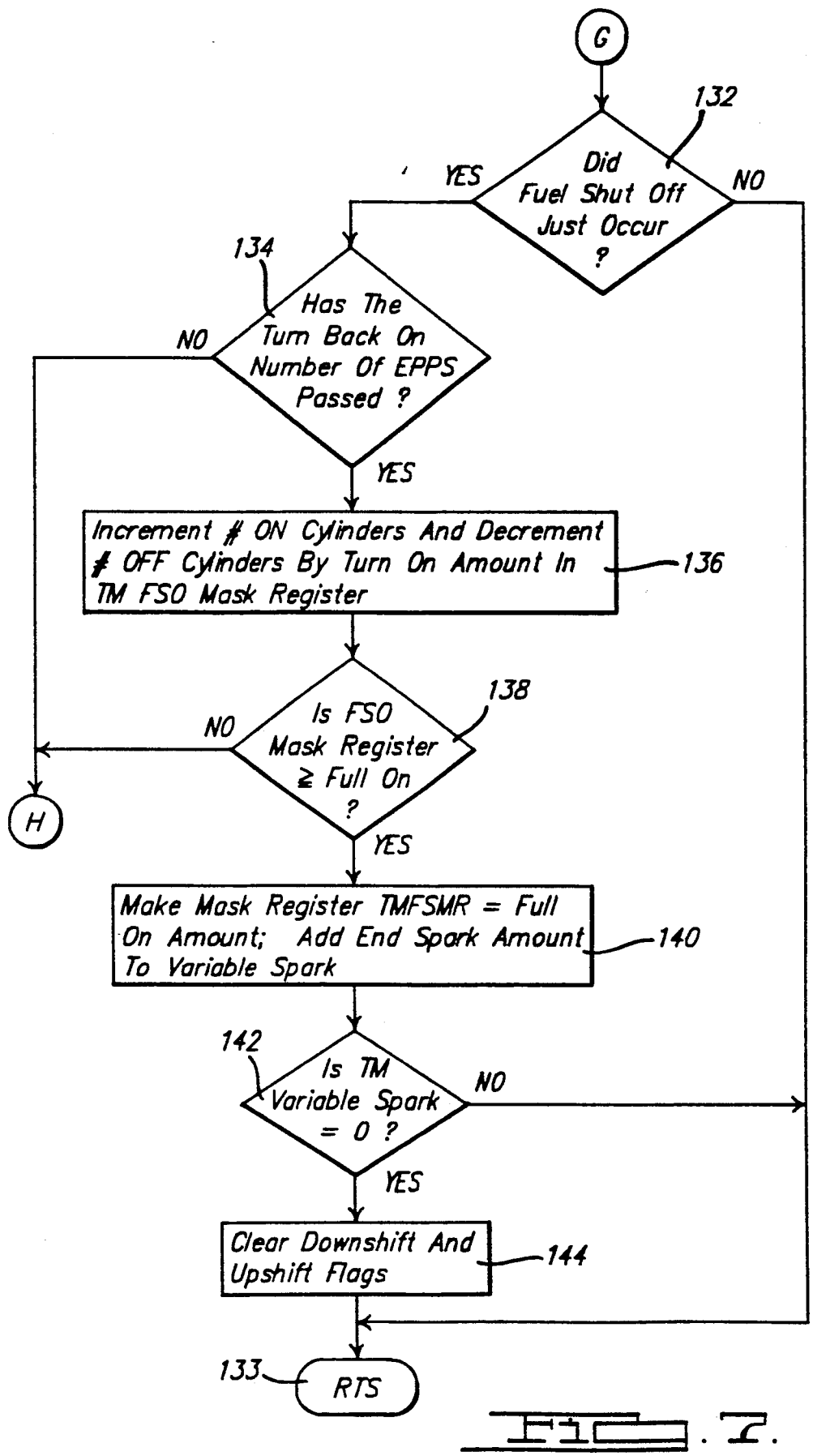

Referring back to block 118, if the fuel shut off is not enabled, TMFSO is clear/disabled, the methodology advances to decision block 132 in FIG. 7. TMFSO being clear is the first condition needed to be met and now the routine will search for the other. In decision block 132, the methodology determines if fuel shut off has just occurred. This is accomplished by checking to see if TMFSMR is less than full ON. If not, the methodology returns through bubble 133. If fuel shut off has just occurred, the methodology advances to decision block 134 and determines if a "turn back on" number of fuel injection events (TONEPP) have passed yet. If not, the methodology advances to block 130 previously described. If the TONEPP have passed, the methodology advances to block 136 and increments the number of ON cylinders and decrements the number of OFF cylinders by the turn on amount (TONAMT). This occurs every time the number of turn on EPPS have elapsed.

From block 136, the methodology advances to decision block 138 and determines if TMFSMR is greater than or equal to full ON. If not, the methodology advances to block 130 previously described. If so, the methodology advances to block 140 and will be making sure that the full ON pattern is not exceeded. In block 140, the methodology makes or sets TMFSMR equal to full ON and adds an end spark amount (TMESPK) to the variable spark amount (TMVSPK). The methodology then advances to decision block 142 and determines if TMVSPK is equal to zero. If not, the methodology advances to bubble 133 and returns to decrement TMVSPK in the spark derate routine until its new value does decrement to zero. This will help smooth out a harsh fuel turn on, with the spark advance derate routine. If TMVSPK does equal zero, the spark derate routine is ramped out. The methodology advances to block 144 and clears the downshift and upshift flags which resets the routine for the next shifting event which will need shift torque management. It should be noted that the shift torque management event ends when both the spark advance and the shut fuel injectors are restored. If the spark advance derate has not been ramped out, then the routine will not reset. Fuel shut off may be over and the routine does nothing, the shift torque management in that case could be shut off in the spark advance derate routine.

The present invention has been described in an illustrative manner. It is to be understood that the terminology which has been used is intended to be in the nature of words of description rather than of limitation.

Many modifications and variations are possible in light of the above teachings. Therefore, within the scope of the appended claims, the present invention may be practiced other than as specifically described.

What is claimed is:

1. A method of controlling engine torque from a vehicle engine to an electronically controlled transmission in response to predetermined conditions existing in the transmission, said method comprising the steps of:
   saving in memory data corresponding to a spark advance setting;
   detecting whether an upshift or downshift type of gear shift of the transmission is occurring;
   incrementing the spark advance setting by a predetermined amount in accordance with a detected upshift or downshift if a downshift or upshift is occurring; and
   comparing the incremented spark advance setting to a predetermined maximum value; and
   returning the spark advance to its original setting at the end of the upshift or downshift.

2. A method as set forth in claim 1 including the step of using the incremented spark advance setting if the incremented spark advance setting is not greater than the predetermined maximum value.

3. A method as set forth in claim 1 including the step of using the predetermined maximum value if the incremented spark advance setting is greater than the predetermined maximum value.

4. A method as set forth in claim 1 including the step of interpolating a predetermined maximum value of spark advance based on throttle position.

5. A method of controlling engine torque from a vehicle engine to an electronically controlled transmission in response to predetermined conditions existing in the transmission, said method comprising the steps of:
   saving in memory data corresponding to a spark advance setting;
   detecting whether an upshift or downshift type of gear shift of the transmission is occurring;
   incrementing the spark advance setting by a predetermined amount in accordance with a detected upshift or downshift if a downshift or upshift is occurring;
   determining if adjustment of the spark advance has occurred;
   decrementing the incremented spark advance setting if adjustment of the spark advance has occurred; and
   returning the spark advance to its original setting at the end of the upshift or downshift.

6. A method as set forth in claim 5 including the step of determining if the decremented spark advance setting is equal to or less than zero.

7. A method as set forth in claim 6 including the step of determining whether fuel flow to the engine is at its normal condition.

8. A method of controlling engine torque from a vehicle engine to an electronically controlled transmission in response to predetermined conditions existing in the transmission, said method comprising the steps of:
   saving in memory data corresponding to a spark advance setting;
   detecting whether an upshift or downshift type of gear shift of the transmission is occurring;
   determining if the upshift or downshift has started if a downshift or upshift is detected;
   enabling adjustment of the spark advance and fuel flow if the upshift or downshift has started;
   disabling adjustment of the spark advance and fuel flow if the upshift or downshift has not started;
   incrementing a variable spark adjustment by a predetermined amount in accordance with a detected upshift or downshift;
   interpolating a predetermined maximum amount of spark advance based on throttle position;
   comparing the variable spark adjustment to the predetermined maximum amount;
   using the variable spark adjustment if the variable spark adjustment is not greater than the predetermined maximum amount;
   using the predetermined maximum amount if the variable spark adjustment is greater than the predetermined maximum value;
   determining if adjustment of the spark advance has just occurred;
   decrementing the variable spark adjustment if the adjustment of the spark advance has just occurred; and
   returning the spark advance setting to its original condition at the end of the upshift or downshift.

* * * * *